Feb. 24, 1942. M. KATCHER 2,274,418

STEERING KNUCKLE JOINT

Original Filed June 11, 1938

INVENTOR
*Morris Katcher*
BY
*Emanuel Scheyer*
ATTORNEY

Patented Feb. 24, 1942

2,274,418

UNITED STATES PATENT OFFICE 2,274,418

STEERING KNUCKLE JOINT

Morris Katcher, New York, N. Y.

Original application June 11, 1938, Serial No. 213,125, now Patent No. 2,197,889, dated April 23, 1940. Divided and this application February 8, 1940, Serial No. 317,996

6 Claims. (Cl. 287—90)

This application is a division of my pending application, Serial No. 213,125, now matured into Patent No. 2,197,889, dated April 23, 1940.

This invention relates to a steering knuckle joint providing limited universality of movements and is particularly adapted for use in tie rod and drag link connections for the steering mechanism of automotive vehicles.

It is an object of this invention to provide dust exclusion means for the joint which will permit relative movement of the housing and the stud and yet prevent dust from entering the housing. The dust exclusion means comprises a cap of flexible substantially inelastic material, preferably leather, although the material need not necessarily be inelastic as long as it is flexible and unaffected by the oil from the knuckle and substantially impervious to the oil.

Other objects and advantages will become apparent upon further study of the description and drawing, in which.

Figure 1:
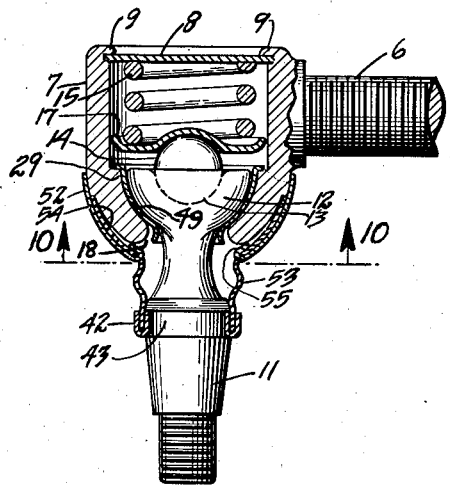
Fig. 1 is a section of the device in which the upper end of the dust cap is fastened to the housing by an annular shell welded to the outside of the housing.
Figure 2:
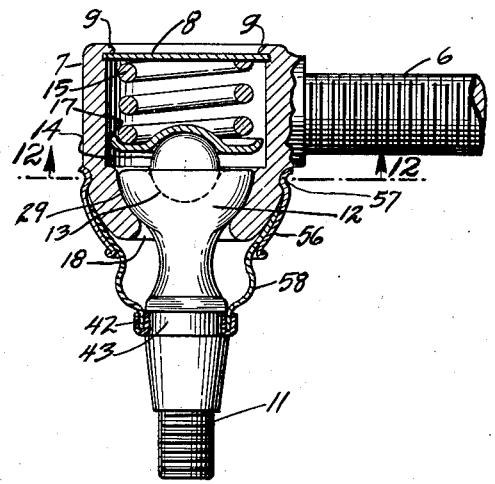
Fig. 2 is a section taken along the line 2—2 of Fig. 1.
Figure 5:
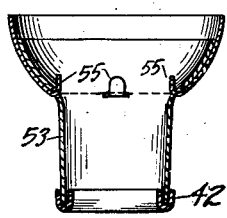
Fig. 5 is a cross section through the annular shell of Fig. 1 shown with the dust cap in extended position and the clamping ring at its bottom, said parts being removed from the rest of the device, the prongs hooking on the dust cap not being bent back as yet.

Threaded shank 6 is provided with a housing 7 at its end. The upper end of housing 7 is closed by means of a circular plate 8 set in a groove near said end, the upper edges of the housing being peened over at 9 to retain said plate. The lower end of housing 7 on the inside is concaved to present a surface 29 in the form of a spherical zone. Nesting in said lower end is a bushing 49 of anti-friction metal such as phosphor-bronze. Stud 11 is provided with a head 12 whose side surface is in the form of a spherical zone fitting inside of bushing 49. The top of head 12 is flat except for a substantially hemispherical depression or socket 13. The center of the sphere of which depression 13 is a segment, is in axial alignment with the longitudinal axis of stud 11. Mounted in socket 13 is a ball bearing 14. Compression spring 15 presses socket cap 17 down on ball bearing 14, the upper end of said spring reacting against the bottom of plate 8. The pressure of spring 15 produces a certain desirable amount of friction between head 12 and the inside of bushing 49 which prevents rattling and lost motion. Further said pressure moves the parts together to take up for wear. The device just described is largely similar to that shown in my Patent No. 2,178,206. A steel shell 52 is spotwelded to the outside of housing 7 at spots 59. Dust cap 53 has its upper portion set in between shell 52 and the outside of housing 7, a setback 54 in the outside of said housing being provided. The lower end of dust cap 53 is crimped in a ring 42 sprung in groove 43. Shell 52 is provided with prongs 55 which extend through the sheet of material forming cap 53, Figs. 1, 2 and 5, said prongs being bent over on the inside. In Fig. 5, prongs 55 are shown before being completely bent.

Figure 3:
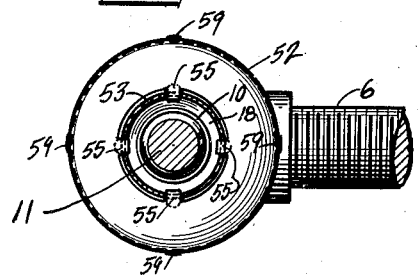
Fig. 3 is a section of the device showing a modification in the way the upper end of the dust cap is fastened to the housing, an annular shell sprung or spun on the housing being used.
Figure 4:
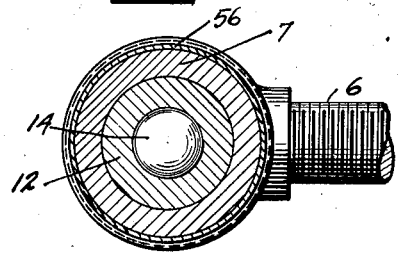
Fig. 4 is a section taken along the line 4—4 of Fig. 3.

In the modification shown in Figs. 3 and 4, shell 56 is fastened to housing 7 either by spinning in a bead 57 into a corresponding groove in said housing or forming said shell in the first place with bead 57 and snapping or springing it into said groove. In spinning or springing shell 56 into place the upper end of dust cap 58 is pinched between said cap and housing 7. The lower end is crimped in a ring 42 sprung in a groove 43 of stud 11.

The terms relating to position such as "upper" and "lower" as used in the claims are intended to be relative only.

I claim:

1. A joint comprising a housing, a stud extending into the housing through an aperture therein, said stud having its end in the housing universally mounted therein for limited universal rotation between the housing and the stud, said housing having an encircling groove on its outside, a shell having an inwardly projecting bead near its upper end fitting in said groove, and a tubular cap of flexible sheet material open at opposite ends, the upper portion of said cap coming between the outside of the housing and the inside of the shell, the lower portion of the cap encircling the stud and being attached thereto closing off the lower end of the cap.

2. A joint comprising a housing, a stud extending into the housing through an aperture therein, said stud having its end in the housing universally mounted therein for limited universal rotation between the housing and the stud, a shell fastened to the outside of the housing and encircling the lower portion thereof, a tubular cap of flexible sheet material open at opposite ends, the upper portion of said cap coming between the outside of the housing and the inside of the shell, the lower portion of the cap encircling the stud and being attached thereto closing off the lower end of the cap, and hooks on the lower portion of the shell, said hooks extending through the material of the cap for supporting said cap.

3. A joint comprising a housing, a stud extending into the housing through an aperture in its lower end, said stud having its end in the housing universally mounted therein for limited universal rotation between the housing and the stud, a shell in the form of a skirt fastened to the outside of the housing at its intermediate portion and encircling the lower portion thereof, the bottom of the shell coming below the bottom of the housing and a tubular cap of flexible sheet material open at opposite ends, the upper portion of said cap coming between the outside of the housing and the inside of the shell, the lower portion of the cap encircling the stud and being attached thereto closing off the lower end of the cap.

4. A joint comprising a housing, a stud extending into the housing through an aperture in its lower end, said stud having its portion in the housing universally mounted therein for limited universal rotation between the housing and the stud, a shell encircling and fastened at its upper end to an intermediate portion of the housing, said shell being in the form of a skirt, the lower portion of the skirt diverging radially outward from the housing, and a tubular cap of flexible material open at opposite ends, the upper portion of the cap coming between the outside of the housing and the inside of the shell, the lower portion of the cap encircling the stud and being attached thereto, closing off the lower end of the cap.

5. A joint comprising a housing, a stud extending into the housing through an aperture in its lower end, said stud having its portion in the housing universally mounted therein for limited universal rotation between the housing and the stud, a shell in the form of a skirt encircling the housing and fastened at its upper portion to the outside of the housing at an intermediate place in the height of the housing, and a tubular cap of flexible material open at opposite ends, the upper portion of the cap encircling the housing and being pinched all around between the shell and the housing substantially at said intermediate place, the lower portion of the cap encircling the stud and being attached thereto closing off the lower end of the cap.

6. A joint comprising a housing, a stud extending into the housing through an aperture in its lower end, said stud having its end in the housing universally mounted therein for limited universal rotation between the housing and the stud, the lower end of the housing being of smaller outside diameter than at its intermediate portion on its outside, a tubular shell in the form of a skirt fastened to the outside of the housing at said intermediate portion and encircling the lower portion thereof, said shell having its lower portion of smaller diameter than its upper portion and of substantially larger diameter than the lower end of the housing, and a tubular cap of flexible sheet material open at opposite ends, the upper portion of said cap coming between the outside of the housing and the inside of the shell, the lower portion of the cap encircling the stud and being attached thereto closing off the lower end of the cap.

MORRIS KATCHER.